United States Patent
Wang et al.

(10) Patent No.: US 7,162,094 B2
(45) Date of Patent: Jan. 9, 2007

(54) FREQUENCY COEFFICIENT SCANNING PATHS FOR CODING DIGITAL VIDEO CONTENT

(75) Inventors: Limin Wang, San Diego, CA (US); David M. Baylon, San Marcos, CA (US); Krit Panusopone, San Diego, CA (US); Rajeev Gandhi, San Diego, CA (US); Yue Yu, San Diego, CA (US); Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 548 days.

(21) Appl. No.: 10/301,076

(22) Filed: Nov. 20, 2002

(65) Prior Publication Data

US 2004/0096109 A1    May 20, 2004

Related U.S. Application Data

(60) Provisional application No. 60/333,921, filed on Nov. 27, 2001.

(51) Int. Cl.
*G06K 9/36* (2006.01)

(52) U.S. Cl. .................................... 382/236

(58) Field of Classification Search ........ 382/232–233, 382/236, 238, 239, 248, 250, 251; 348/384.1, 348/394.1, 395.1, 403.1, 404.1, 407.1, 416.1, 348/420.1, 421.1, 430.1, 431.1; 375/240, 375/245, 240.02–240.03, 240.11–240.14, 375/240.15–240.16, 240.18, 240.2, 240.24, 375/240.25; 341/67, 79
See application file for complete search history.

(56) References Cited

U.S. PATENT DOCUMENTS

| | | | | |
|---|---|---|---|---|
| 4,821,119 | A * | 4/1989 | Gharavi | 375/240.16 |
| 5,410,350 | A * | 4/1995 | Kato et al. | 348/400.1 |
| 5,424,778 | A * | 6/1995 | Sugiyama et al. | 375/240.2 |
| 5,500,678 | A * | 3/1996 | Puri | 348/408.1 |
| 5,504,530 | A * | 4/1996 | Obikane et al. | 375/240.14 |
| 5,534,927 | A * | 7/1996 | Shishikui et al. | 348/400.1 |
| 5,583,657 | A * | 12/1996 | Jeong | 382/248 |
| 5,949,912 | A * | 9/1999 | Wu | 382/246 |
| 6,054,943 | A * | 4/2000 | Lawrence | 341/87 |
| 6,516,318 | B1 * | 2/2003 | Nakamura et al. | 707/10 |
| 6,608,865 | B1 * | 8/2003 | Itoh | 375/240.08 |
| 6,658,157 | B1 * | 12/2003 | Satoh et al. | 382/239 |
| 6,859,559 | B1 * | 2/2005 | Boon et al. | 382/238 |
| 2005/0002582 | A1 | 1/2005 | Wang et al. | |
| 2005/0008239 | A1 | 1/2005 | Wang et al. | |

(Continued)

OTHER PUBLICATIONS

"Adaptive field/frame block coding experiment proposal VCEG-76," ITU—Telecommunications Standardization Sector ITU-T Q.6/SG16 Video Coding Expert Group (VCEG), Sep. 24-27, 2001, pp. 1-7, XP002257036, Santa Barbara, CA USA, the whole document.

(Continued)

*Primary Examiner*—Jose L. Couso
(74) *Attorney, Agent, or Firm*—Benjamin D. Driscoll

(57) ABSTRACT

A method and system of transform-based encoding, decoding, and bitstream generation of digital video content. The digital video content comprises a stream of pictures, slices, or macroblocks which can each be intra, predicted or bi-predicted pictures. The pictures, slices, or macroblocks comprise blocks of pixels. The method comprises scanning frequency coefficients from each of the block's two dimensional array of frequency coefficients in a manner that is vertically biased.

10 Claims, 3 Drawing Sheets

U.S. PATENT DOCUMENTS

2005/0008241 A1    1/2005    Wang et al.

OTHER PUBLICATIONS

"Core Experiment on Interlaced Video Coding VCEG-N85," Borgwardt, P., ITU-T Q.6/SG16 Video Coding Expert Group (VCEG), Sep. 24-27, 2001, pp. 1-10, XP002257037 Santa Barbara, CA, USA, the whole document.

"Text of Final Committe Draft Joint Video Specification (ITU-T Rec. H.264/ISO/IEC 14496-10 AVC)" International Organization for Standardizatin—Organisation International de Normallsation, MPEG N4920, Jul. 2002, pp. I-XV, 1-197, XP001100641 Klagenfurt, Austria, cited in teh application p. I -p. XII p. 142 -p. 144; figures 12.7-12.10.

P. Borgwardt: "Core Experiment on Interlaced Vido Coding VCEG-N85" ITU-Telecommunications Standardization Sector ITU-T Q.6/SG16 Video Coding Expert Group (VCEG) Sep. 24-27, 2001, pp. 1-10, XP002257037 Santa Barbara, CA USA.

"H.26L Test Model Long Term Number 8 (TML-8) Drafto" ITU-T Telecommunication Standardization Sector of ITU, Geneva, CH, Apr. 2, 2001, pp. 1-54, XP001089814 p. 9, paragray 1 -p. 10, paragraph 2.3 p. 39, paragraph 6.1.2.2.1 -p. 40.

P. Borgwardt: "Handling Interfaced Video in H. 26L VCEG-N57" ITU- Telecommunications Standardization Sector ITU Q.6/SG16 Video Coding Expert Group (VCEG), Sep. 24-27, 2001, pp. 1-3, XP002257142 Santa Barbara, CA, USA.

M. Gallant et al.: "High Rate, High Resolution Video Using H.26L VCEG-N84" IUT- Telecommunications Standardization Sector ITU Q.6/SG16 Video Coding Expert Group (VCEG), Sep. 24-27, 2001, pp. 1-7, XP002257143 Santa Barbara, CA, USA p. 1- p. 3.

T. Ebrahimi (editor), "MPEG-4 Video Verification Model Version 10.0", ISO/IEC JTC1/SC29/WG11 MPEG98/N1992, San Jose CA, Feb. 1998.

G. Bjontegaard, "Calculation of average PSNR Differences between RD-curves", VDEG-M33, Austin TX, Mar. 26, 2001.

M. Wien, "ABT Coding for Higher Resolution Video", JVT of ISO/IEC MPEG and ITU-T VCEG, JVT-B053, Geneva Switzerland, Jan. 20, 2002.

K. Sato, "New Interlace Coding Tools", JVT of ISO/IEC MPEG and ITU-T VCEG, JVT-B068, Geneva Switzerland, Jan. 23, 2002.

T. Weigand (contact), Joint Final Committee Draft (JFCD) of Joint Video Specification (ITU-T Rec. H.264/ISO/IEC 14496-10 AVC), Klagenfurt Austria, Aug 10, 2002.

T. Wiegand, Proposed Draft Text Modifications for Joint Video Specification (ITU-T Rec. H.264/ISO/IEC 14496-10 AVC), Draft 7, JVT-E022d7, Sep. 19, 2002.

* cited by examiner

-PRIOR ART-

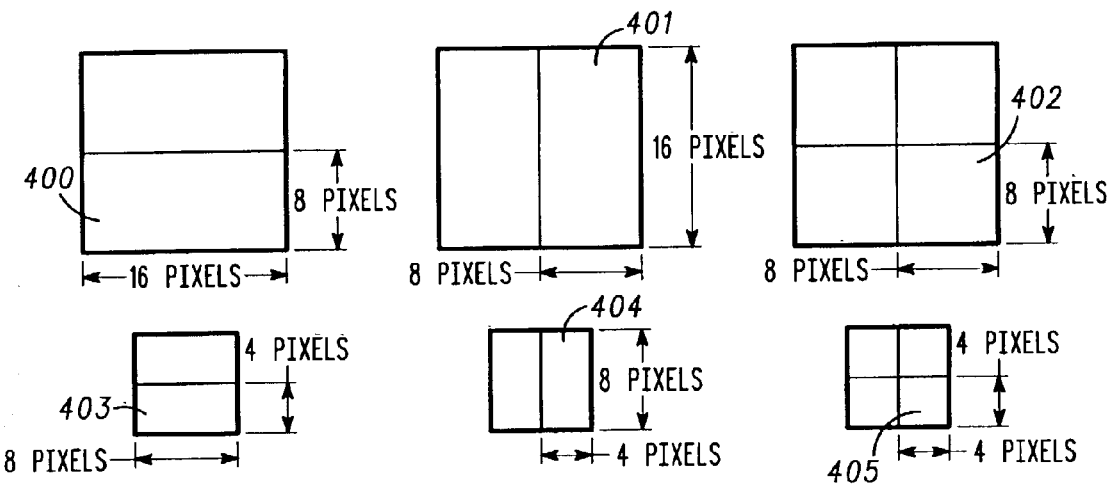
FIG. 4
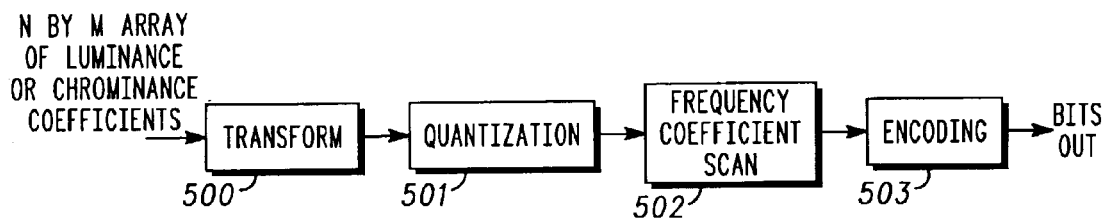
FIG. 5
FIG. 6
FIG. 7

N

| 0 | 2 | 6 | 10 | 14 | 18 | 22 | 26 |
|---|---|---|----|----|----|----|----|
| 1 | 5 | 9 | 13 | 17 | 21 | 25 | 29 |
| 3 | 7 | 11 | 15 | 19 | 23 | 27 | 30 |
| 4 | 8 | 12 | 16 | 20 | 24 | 28 | 31 |

| 0 | 3 | 8 | 15 | 22 | 30 | 38 | 52 |
|---|---|---|----|----|----|----|----|
| 1 | 4 | 14 | 21 | 29 | 37 | 45 | 53 |
| 2 | 7 | 16 | 23 | 31 | 39 | 46 | 58 |
| 5 | 9 | 20 | 28 | 36 | 44 | 51 | 59 |
| 6 | 13 | 24 | 32 | 40 | 47 | 54 | 60 |
| 10 | 17 | 25 | 33 | 41 | 48 | 55 | 61 |
| 11 | 18 | 26 | 34 | 42 | 49 | 56 | 62 |
| 12 | 19 | 27 | 35 | 43 | 50 | 57 | 63 |

FREQUENCY COEFFICIENT SCANNING PATHS FOR CODING DIGITAL VIDEO CONTENT

RELATED APPLICATIONS

The present application claims priority under 35 U.S.C. § 119(e) from the following previously-filed Provisional Patent Application, U.S. Application No. 60/333,921, filed Nov. 27, 2001 by Limin Wang et al., entitled "Method and System for handling Interlaced Video with the H.26L Encoding Standard," and which is incorporated herein by reference in its entirety.

TECHNICAL FIELD

The present invention relates to digital video encoding, decoding, and bitstream generation. More specifically, the present invention relates to scanning paths in transform-based coding as used in MPEG-4 Part 10 Advanced Video Coding/H.264, for example.

BACKGROUND

Video compression is used in many current and emerging products. It is at the heart of digital television set-top boxes (STBs), digital satellite systems (DSSs), high definition television (HDTV) decoders, digital versatile disk (DVD) players, video conferencing, Internet video and multimedia content, and other digital video applications. Without video compression, the number of bits required to represent digital video content can be extremely large, making it difficult or even impossible for the digital video content to be efficiently stored, transmitted, or viewed.

The digital video content comprises a stream of pictures that can be displayed as an image on a television receiver, computer monitor, or some other electronic device capable of displaying digital video content. A picture that is displayed in time before a particular picture is in the "backward direction" in relation to the particular picture. Likewise, a picture that is displayed in time after a particular picture is in the "forward direction" in relation to the particular picture.

Video compression is accomplished in a video encoding, or coding, process in which each picture is encoded as either a frame or as two fields. Each frame comprises a number of lines of spatial information. For example, a typical frame contains 480 horizontal lines. Each field contains half the number of lines in the frame. For example, if the frame comprises 480 horizontal lines, each field comprises 240 horizontal lines. In a typical configuration, one of the fields comprises the odd numbered lines in the frame and the other field comprises the even numbered lines in the frame. The field that comprises the odd numbered lines will be referred to as the "top" field hereafter and in the appended claims, unless otherwise specifically denoted. Likewise, the field that comprises the even numbered lines will be referred to as the "bottom" field hereafter and in the appended claims, unless otherwise specifically denoted. The two fields can be interlaced together to form an interlaced frame.

The general idea behind video coding is to remove data from the digital video content that is "non-essential." The decreased amount of data then requires less bandwidth for broadcast or transmission. After the compressed video data has been transmitted, it must be decoded, or decompressed. In this process, the transmitted video data is processed to generate approximation data that is substituted into the video data to replace the "non-essential" data that was removed in the coding process.

Video coding transforms the digital video content into a compressed form that can be stored using less space and transmitted using less bandwidth than uncompressed digital video content. It does so by taking advantage of temporal and spatial redundancies in the pictures of the video content. The digital video content can be stored in a storage medium such as a hard drive, DVD, or some other non-volatile storage unit.

There are numerous video coding methods that compress the digital video content. Consequently, video coding standards have been developed to standardize the various video coding methods so that the compressed digital video content is rendered in formats that a majority of video encoders and decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H.261, and ITU-T H.263 standards.

However, as the demand for higher resolutions, more complex graphical content, and faster transmission time increases, so does the need for better video compression methods. To this end, a new video coding standard is currently being developed. This new video coding standard is called the MPEG-4 Part 10 Advanced Video Coding (AVC)/H.264 standard.

Most modern video coding standards, including the MPEG-4 Part 10 AVC/H.264 standard, are based in part on a temporal prediction with motion compensation (MC) algorithm and a transform domain coding algorithm.

Temporal prediction with motion compensation is used to remove temporal redundancy between successive pictures in a digital video broadcast. The temporal prediction with motion compensation algorithm typically utilizes one or two reference pictures to encode a particular picture. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm. One of the reference pictures is in the backward direction in relation to the particular picture that is to be encoded. The other reference picture is in the forward direction in relation to the particular picture that is to be encoded.

Transform domain coding is used to remove spatial redundancy within each picture or temporally predicted residual picture. A residual picture is the difference between a picture and a picture that is temporally predicted from that picture. Each picture or temporally predicted residual picture comprises a number of blocks of pixels. Each block refers to an N by M group of pixels where N refers to the number of columns of pixels in the block and M refers to the number of rows of pixels in the block. Each block in the picture or temporally predicted residual picture is represented by an N by M array of luminance and chrominance coefficients which correspond to each pixel in the blocks' N by M grid of pixels. Each luminance coefficient represents the brightness level, or luminance, of its corresponding pixel. Each block in the picture or temporally predicted residual picture is also represented by an N by M array of chrominance coefficients which correspond to each pixel in the blocks' N by M grid of pixels. Each chrominance coefficient represents the color content, or chrominance, of its corresponding pixel. The term "picture" will be used hereafter and in the appended claims, unless otherwise specifically denoted, to mean either a picture or a temporally predicted residual picture.

Most pictures have smooth color variations, with the fine details being represented as sharp edges in between the smooth variations. The smooth variations in color can be termed as low frequency variations and the sharp variations as high frequency variations. The smooth variations in color, or low frequency components of the picture, constitute the base of an image, and the edges which give detail to the picture, or the high frequency components, add upon the smooth variations in color to refine the picture. The combination of the low and high frequency components results in a detailed image.

Typically, the values of the luminance coefficients only vary slightly between the most of the pixels in a particular picture. Consequentially, in many pictures, most pixels contain more of the low frequency component than the high frequency component. In other words, most of the energy of a signal containing the digital video content lies at low frequencies.

Transform domain coding takes advantage of the fact that most of the energy of a signal containing the digital video content lies at low frequencies. Transform domain coding transforms the luminance coefficients in each N by M array from the spatial domain to the frequency domain. The transformed N by M array comprises coefficients which represent energy levels in the frequency domain. As used hereafter and in the appended claims, unless otherwise denoted, the coefficients of the transformed N by M array will be referred to as "frequency coefficients." Once the luminance coefficients have been transformed into frequency coefficients, various compression techniques can then be performed on the contents of picture in the frequency domain that would otherwise be impossible to perform in the spatial domain.

The N by M array of frequency coefficients is two dimensional and must be converted into a one dimensional array of frequency coefficients so that the encoder or decoder can use the frequency coefficients to encode or decode the picture. The encoder generates the one dimensional array of frequency coefficients by scanning the two dimensional array of frequency coefficients using a particular scanning path. The scanning path refers to the order in which the frequency coefficients in the two dimensional array are scanned and output by the encoder into the one dimensional array.

A common scanning path that is used by an encoder to scan the frequency coefficients is a zig-zag scanning path. FIG. 1 illustrates two variations of zig-zag scanning paths that are currently used to scan a four by four array of frequency coefficients. As shown in FIG. 1, the first zig-zag scanning path (100) goes in a zig-zag order starting with an upper left coefficient (0) and ending with a lower right coefficient (15) of the array of frequency coefficients. The second zig-zag scanning path (101) is similar to the first in that it starts with the upper left coefficient (0) and ends with the lower right coefficient (15). However, as shown in FIG. 1, the two zig-zag scanning paths (100, 101) differ slightly in the order that the coefficients are scanned. FIG. 1 also shows one non-zig-zag scanning path (102) that is also prior art. Other prior art scanning paths for an 8 by 8 array of frequency coefficients can be found in MPEG-2 (Generic Coding of Moving Pictures and Associated Audio, Draft of International Standard, ISO/IEC 13818-2, March 1994).

It is preferable for the encoder to first scan the high-energy low frequency coefficients and then scan the low-energy high frequency coefficients. Scanning the low frequency coefficients before the high frequency coefficients places the low frequency coefficients before the high frequency coefficients in the resulting one dimensional array of coefficients. This particular order allows efficient coding and compression of the picture.

The zig-zag scanning path scans the two dimensional array of frequency coefficients without any significant bias towards the horizontal or vertical frequency directions. However, for interlaced material, energy tends to be concentrated along the vertical direction, and a scanning path which is biased in the vertical direction would capture more of the non-zero coefficients first, thereby allowing for better compression efficiency.

Thus, there is a need in the art for scanning paths that allow for more compression than do traditional zig-zag scanning paths.

SUMMARY OF THE INVENTION

In one of many possible embodiments, the present invention provides a method of scanning frequency coefficients in a manner that is efficient for interlaced digital video content. The digital video content comprises a stream of pictures, slices, or macroblocks which can each be intra, predicted or bi-predicted pictures. The pictures, slices, or macroblocks comprise blocks of pixels. The method comprises scanning frequency coefficients from each of the block's two dimensional array of frequency coefficients in a manner that is vertically biased.

Another embodiment of the present invention provides an encoder that scans frequency coefficients in a manner that is efficient for interlaced digital video content. The digital video content comprises a stream of pictures, slices, or macroblocks which can each be intra, predicted or bi-predicted pictures. The pictures comprise blocks of pixels. The method comprises scanning frequency coefficients from each of the block's two dimensional array of frequency coefficients in a manner that is vertically biased.

Another embodiment of the present invention provides a decoder that scans frequency coefficients in a manner that is efficient for interlaced digital video content. The digital video content comprises a stream of pictures, slices, or macroblocks which can be each be intra, predicted or bi-predicted pictures. The pictures comprise blocks of pixels. The method comprises scanning frequency coefficients from each of the block's two dimensional array of frequency coefficients in a manner that is vertically biased.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

FIG. 4 shows that a macroblock can be further divided into smaller sized blocks.

FIG. 5 illustrates a preferable method of transform domain coding according to an embodiment of the present invention.

FIG. 6 shows a preferable scanning path for a four by four pixel block's frequency coefficient array according to an embodiment of the present invention.

FIG. 7 shows a preferable scanning path for a four by eight pixel block's frequency coefficient array according to an embodiment of the present invention.

FIG. 8 shows a preferable scanning path for an eight by four pixel block's frequency coefficient array according to an embodiment of the present invention.

FIG. 9 shows a preferable scanning path for an eight by eight pixel block's frequency coefficient array according to an embodiment of the present invention.

Throughout the drawings, identical reference numbers designate similar, but not necessarily identical, elements.

DETAILED DESCRIPTION OF EMBODIMENTS OF THE INVENTION

The present invention provides methods for scanning frequency coefficients from a two dimensional array of frequency coefficients. These can be used in any digital video coding algorithm. In particular, they can be implemented in the MPEG-4 Part 10 AVC/H.264 video coding standard.

As noted above, the MPEG-4 Part 10 AVC/H.264 standard is a new standard for encoding and compressing digital video content. The documents establishing the MPEG-4 Part 10 AVC/H.264 standard are hereby incorporated by reference. The JVT consists of experts from MPEG and ITU-T. Due to the public nature of the MPEG-4 Part 10 AVC/H.264 standard, the present specification will not attempt to document all the existing aspects of MPEG-4 Part 10 AVC/H.264 video coding, relying instead on the incorporated specifications of the standard.

The current method can be used in any general digital video coding algorithm or system requiring coefficient scanning. It can be modified and used to handle the extraction of frequency coefficients from a two dimensional array of frequency coefficients as best serves a particular standard or application.

Using the drawings, the preferred embodiments of the present invention will now be explained.

Figure 1:
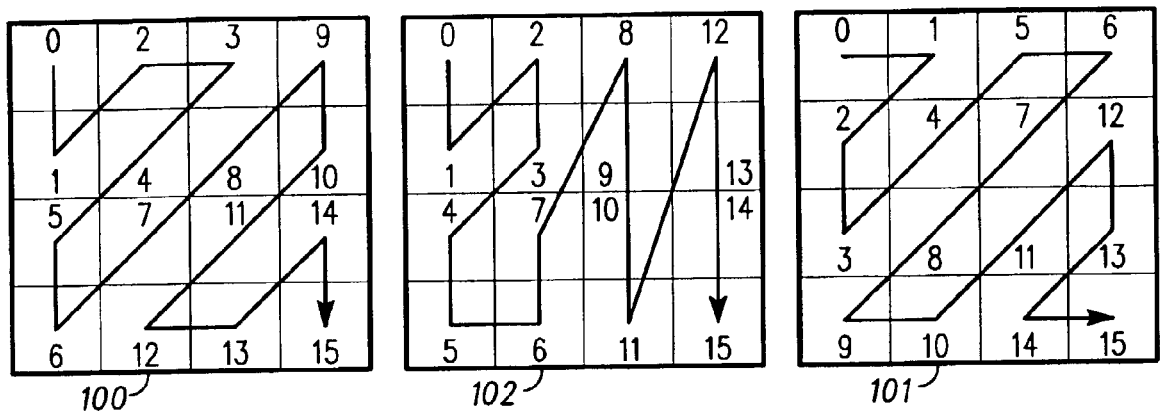
FIG. 1 is prior art and illustrates two variations of zig-zag scanning paths and a non-zig-zag scanning path that are currently used to scan a four by four array of frequency coefficients.
Figure 2:
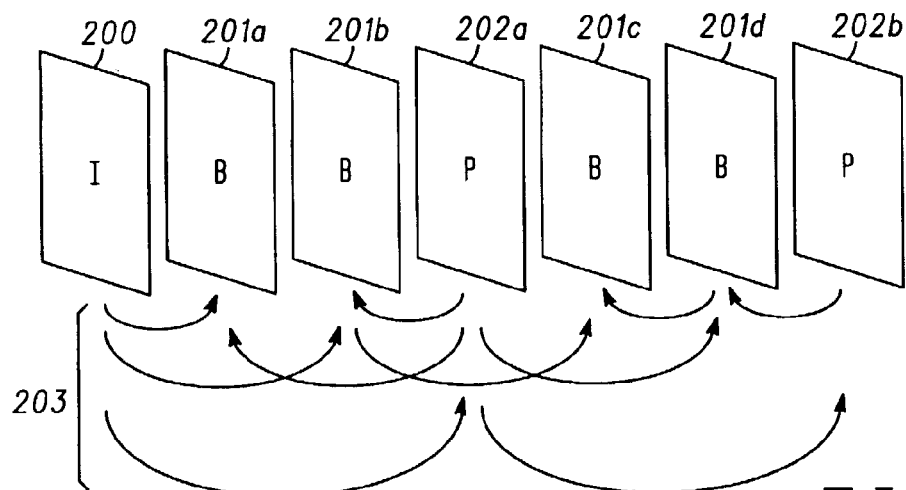
FIG. 2 illustrates an exemplary sequence of three types of pictures according to an embodiment of the present invention, as defined by an exemplary video coding standard such as the MPEG-4 Part 10 AVC/H.264 standard.

As shown in FIG. 2, there are preferably three types of pictures that can be used in the video coding method. Three types of pictures are defined to support random access to stored digital video content while exploring the maximum redundancy reduction using temporal prediction with motion compensation. The three types of pictures are intra (I) pictures (200), predicted (P) pictures (202a,b), and bi-predicted (B) pictures (201a–d). An I picture (200) provides an access point for random access to stored digital video content. Intra pictures (200) are encoded without referring to reference pictures and can be encoded with moderate compression.

A predicted picture (202a,b) is encoded using an I, P, or B picture that has already been encoded as a reference picture. The reference picture can be in either the forward or backward temporal direction in relation to the P picture that is being encoded. The predicted pictures (202a,b) can be encoded with more compression than the intra pictures (200).

A bi-predicted picture (201a–d) is encoded using two temporal reference pictures. An embodiment of the present invention is that the two temporal reference pictures can be in the same or different temporal direction in relation to the B picture that is being encoded. Bi-predicted pictures (201a–d) can be encoded with the most compression out of the three picture types.

Reference relationships (203) between the three picture types are illustrated in FIG. 2. For example, the P picture (202a) can be encoded using the encoded I picture (200) as its reference picture. The B pictures (201a–d) can be encoded using the encoded I picture (200) and the encoded P pictures (202a,b) is its reference pictures, as shown in FIG. 2. Under the principles of an embodiment of the present invention, encoded B pictures (201a–d) can also be used as reference pictures for other B pictures that are to be encoded. For example, the B picture (201c) of FIG. 2 is shown with two other B pictures (201b and 201d) as its reference pictures.

The number and particular order of the I (200), B (201a–d), and P (202a,b) pictures shown in FIG. 2 are given as an exemplary configuration of pictures, but are not necessary to implement the present invention. Any number of I, B, and P pictures can be used in any order to best serve a particular application. The MPEG-4 Part 10 AVC/H.264 standard does not impose any limit to the number of B pictures between two reference pictures nor does it limit the number of pictures between two I pictures.

Figure 3:
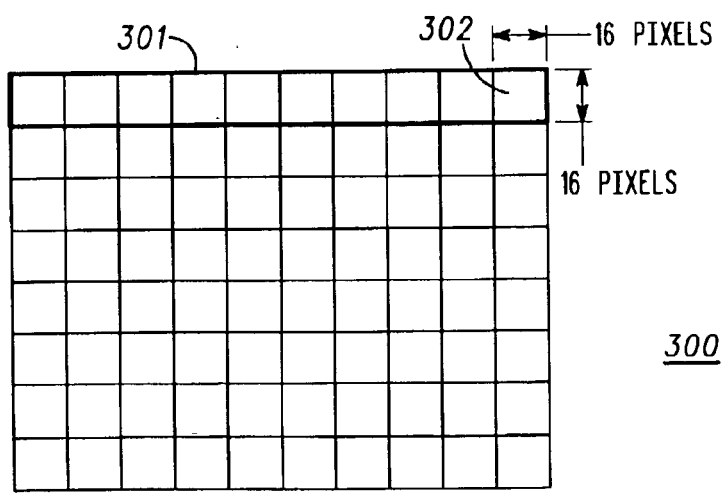
FIG. 3 shows that each picture is preferably divided into one or more slices consisting of macroblocks.

FIG. 3 shows that each picture (300) is preferably divided into slices consisting of macroblocks. A slice (301) is a group of macroblocks and a macroblock (302) is a rectangular group of pixels. As shown in FIG. 3, a preferable macroblock (302) size is 16 by 16 pixels.

Each interlaced picture, slice, or macroblock in a stream of pictures that is to be encoded can be encoded using adaptive frame/field (AFF) coding. In AFF coding, each picture, slice, or macroblock in a stream of pictures that is to be encoded is encoded in either frame mode or in field mode, regardless of the encoding mode of the previous picture, slice, or macroblock. If a picture, slice, or macroblock is encoded in frame mode, the two fields that make up an interlaced frame are coded jointly. Conversely, if a picture, slice, or macroblock is encoded in field mode, the two fields that make up an interlaced frame are coded separately. The encoder determines which type of coding, frame mode coding or field mode coding, is more advantageous for each picture, slice, or macroblock and chooses that type of encoding for the picture, slice, or macroblock. The exact method of choosing between frame mode and field mode is not critical to the present invention and will not be detailed herein.

FIG. 4 shows that a macroblock can be further divided into smaller sized blocks. For example, as shown in FIG. 4, a macroblock can be further divided into block sizes of 16 by 8 pixels (400), 8 by 16 pixels (401), or 8 by 8 pixels (402). A block size of 8 by 8 pixels (402) can be further subdivided into block sizes of 8 by 4 pixels (403), 4 by 8 pixels (404), or 4 by 4 pixels (405).

A picture that is to be encoded using transform domain coding can sometimes be encoded with better picture quality or more compression efficiency if the transform domain coding is performed on the smaller block sizes of FIG. 4 rather than on the macroblock itself. Some digital video coding algorithms allow for variable block size transforms.

Variable block size transform coding means that the transform domain coding can be performed on blocks of varying sizes. For example, transform domain coding can be performed on 4 by 4 pixel blocks (405) for a particular macroblock and on 4 by 8 pixel blocks (404) for a different macroblock. Transform domain coding on the following block sizes can be implemented according to an embodiment of the present invention: 4 by 4 pixels (405), 8 by 4 pixels (403), 4 by 8 pixels (404), and 8 by 8 pixels (402).

FIG. 5 illustrates a preferable method of transform domain coding according to an embodiment of the present invention. As shown in FIG. 5, a transform (500) is performed on a block's N by M array of luminance or chrominance coefficients. The N by M array of luminance or chrominance coefficients comprises the coefficients that represent the luminance or chrominance of the pixels in the N by M block. The N by M array of luminance or chrominance coefficients can be a 4 by 4 array, 4 by 8 array, 8 by 4 array, or an 8 by 8 array under principles of an embodiment of the present invention.

The discrete cosine transform (DCT) is an example of a transform and is similar to the discrete Fourier transform. The DCT transforms the N by M array of luminance or chrominance coefficients from the spatial domain to the frequency domain. The general equation for a two dimensional, N by M, DCT can be defined by the following equation:

$$F(u, v) = \left(\frac{2}{N}\right)^{\frac{1}{2}} \left(\frac{2}{M}\right)^{\frac{1}{2}} \sum_{i=0}^{N-1} \sum_{j=0}^{M-1} \Lambda(i) \cdot \Lambda(j) \cdot \cos\left[\frac{\pi \cdot u}{2 \cdot N}(2i+1)\right]$$
$$\cos\left[\frac{\pi \cdot v}{2 \cdot M}(2j+1)\right] \cdot f(i, j)$$

where $\Lambda(\xi) = \begin{cases} \frac{1}{\sqrt{2}} & \text{for } \xi = 0 \\ 1 & \text{otherwise} \end{cases}$.

In the above equations, f(i, j) represents the luminance or chrominance value of the pixel in column i and row j of the N by M array of luminance coefficients. F(u, v) is the corresponding frequency coefficient in column u and row v in the N by M array of frequency coefficients. For most images, much of the signal energy lies at low frequencies. In general, the low frequency coefficients appear in the upper left corner of the N by M array of frequency coefficients. The high frequency coefficients usually appear in the lower right corner of the N by M array of frequency coefficients.

After the luminance or chrominance coefficients have been converted to frequency coefficients by the transform (500), the frequency coefficients are quantized (501), as shown in FIG. 5. Quantization (501) is performed on the frequency coefficients so that the number of bits that must be encoded is reduced. This allows for more compression.

One example of the quantization process (501) consists of dividing each F(u, v) by a constant, q(u,v). A table of q(u,v) is called a quantization table. An exemplary, but not exclusive, quantization table for an 8 by 8 array of frequency coefficients is shown in Table 1 below:

TABLE 1

| Eight by eight quantization table | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 36 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Similar quantization tables can be constructed for the other sizes of the N by M frequency coefficient array. As shown in exemplary quantization table, the constants that divide each F(u,v) are larger in value in the lower right corner of the quantization table than they are in the upper left corner. An important result of the quantization process is that many of the high frequency coefficients are quantized to a value of zero.

Returning to FIG. 5, the quantized frequency coefficients are scanned (502) by the encoder to convert them from a two dimensional array of quantized frequency coefficients to a one dimensional array of quantized frequency coefficients. Preferable scanning paths will be described in more detail in connection with FIGS. 6–9.

After the quantized frequency coefficients have been scanned into the one dimensional array, they can be encoded (503), as shown in FIG. 5. An exemplary encoding (503) process preferably encodes the quantized frequency coefficients in the one dimensional array into a sequence of run-level pairs. The run is defined as the distance between two non-zero quantized frequency coefficients in the one dimensional array. The level is the non-zero value immediately following a sequence of zeros. This type of coding produces a compact representation of the quantized frequency coefficients because a large number of the quantized coefficients have a value of zero. The run-level pairs can be further compressed using entropy coding. One method of entropy coding is described in detail in the MPEG-4 Part 10 AVC/H.264 standard. MPEG-4 Part 10 AVC/H.264 also uses context-adaptive binary arithmetic coding (CABAC).

Preferable scanning paths for scanning the frequency coefficients in the two dimensional array into a one dimensional array of frequency coefficients will now be explained in connection with FIGS. 6–9. An ideal scanning path in any block size would group all the non-zero quantized frequency coefficients together in the one dimensional array followed by all the quantized frequency coefficients that have values of zero. However, in practice, a preferable scanning path can only group together a majority of non-zero quantized frequency coefficients. For interlaced material, the non-zero quantized frequency coefficients tend to be concentrated along the vertical direction and a vertically biased scanning path may be preferable.

FIGS. 6–9 show preferable scanning path orders for a 4 by 4 pixel block, 4 by 8 pixel block, 8 by 4 pixel block, and an 8 by 8 pixel block, respectively. In the following descriptions, n=0, 1, . . . , N−1, where n is a variable that represents the pixel column number in the block as well as the corresponding frequency coefficient column number in the corresponding frequency coefficient array. N is the total number of pixel columns in the block and the total number of frequency coefficient columns in the frequency coefficient array. The left-most column number is 0 and the right-most column number is N−1. Likewise, m=0, 1, . . . , M−1, where m is a variable that represents the pixel row number in the block as well as the corresponding frequency coefficient row number in the corresponding frequency coefficient row number in the corresponding frequency coefficient array. M is the total number of pixel rows in the block and the total number of frequency coefficient rows in the frequency coefficient array. The top row number is 0 and the bottom row number is M−1. These preferable scanning paths were derived using experimentation and statistical techniques. The scanning paths of FIGS. 6–9 are skewed, or biased, in the vertical direction and result in more compression than traditional zig-zag scanning paths in many applications, including interlaced video encoding.

FIG. 6 shows a preferable scanning path for a 4 by 4 pixel block's frequency coefficient array, where N=4 and M=4. The numbers in FIG. 6 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 15. Table 2 lists the frequency coefficient scanning order and the corresponding values for n and m.

TABLE 2

Four by four pixel block scanning order

| Frequency Coefficient Scanning Order | n | m |
|---|---|---|
| 0 | 0 | 0 |
| 1 | 0 | 1 |
| 2 | 1 | 0 |
| 3 | 0 | 2 |
| 4 | 0 | 3 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |
| 12 | 3 | 0 |
| 13 | 3 | 1 |
| 14 | 3 | 2 |
| 15 | 3 | 3 |

FIG. 7 shows a preferable scanning path for a 4 by 8 pixel block's frequency coefficient array, where N=4 and M=8. The numbers in FIG. 7 represent the frequency coefficient scanning order. For example, the frequency coefficient corresponding to the top left pixel is the frequency coefficient to get scanned and is thus labeled with a 0. The frequency coefficient corresponding to the bottom right pixel is the last frequency coefficient to get scanned and is thus labeled with a 31. Table 3 lists the frequency coefficient scanning order and the corresponding values for n and m.

TABLE 3

Four by eight pixel block scanning order

| Frequency Coefficient Scanning Order | n | m |
|---|---|---|
| 0 | 0 | 0 |
| 1 | 0 | 1 |
| 2 | 0 | 2 |
| 3 | 0 | 3 |
| 4 | 1 | 0 |

TABLE 3-continued

Four by eight pixel block scanning order

| Frequency Coefficient Scanning Order | n | m |
|---|---|---|
| 5 | 1 | 1 |
| 6 | 1 | 2 |
| 7 | 0 | 4 |
| 8 | 0 | 5 |
| 9 | 0 | 6 |
| 10 | 0 | 7 |
| 11 | 1 | 3 |
| 12 | 2 | 0 |
| 13 | 2 | 1 |
| 14 | 2 | 2 |
| 15 | 1 | 4 |
| 16 | 1 | 5 |
| 17 | 1 | 6 |
| 18 | 1 | 7 |
| 19 | 2 | 3 |
| 20 | 3 | 0 |
| 21 | 3 | 1 |
| 22 | 3 | 2 |
| 23 | 2 | 4 |
| 24 | 2 | 5 |
| 25 | 2 | 6 |
| 26 | 2 | 7 |
| 27 | 3 | 3 |
| 28 | 3 | 4 |
| 29 | 3 | 5 |
| 30 | 3 | 6 |
| 31 | 3 | 7 |

FIG. 8 shows a preferable scanning path for an 8 by 4 pixel block's frequency coefficient array, where N=8 and M=4. The numbers in FIG. 8 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 31. Table 4 lists the frequency coefficient scanning order and the corresponding values for n and m.

TABLE 4

Eight by four pixel block scanning order

| Frequency Coefficient Scanning Order | n | m |
|---|---|---|
| 0 | 0 | 0 |
| 1 | 0 | 1 |
| 2 | 1 | 0 |
| 3 | 0 | 2 |
| 4 | 0 | 3 |
| 5 | 1 | 1 |
| 6 | 2 | 0 |
| 7 | 1 | 2 |
| 8 | 1 | 3 |
| 9 | 2 | 1 |
| 10 | 3 | 0 |
| 11 | 2 | 2 |
| 12 | 2 | 3 |
| 13 | 3 | 1 |
| 14 | 4 | 0 |
| 15 | 3 | 2 |
| 16 | 3 | 3 |
| 17 | 4 | 1 |
| 18 | 5 | 0 |
| 19 | 4 | 2 |

TABLE 4-continued

Eight by four pixel block scanning order

| Frequency Coefficient Scanning Order | n | m |
|---|---|---|
| 20 | 4 | 3 |
| 21 | 5 | 1 |
| 22 | 6 | 0 |
| 23 | 5 | 2 |
| 24 | 5 | 3 |
| 25 | 6 | 1 |
| 26 | 7 | 0 |
| 27 | 6 | 2 |
| 28 | 6 | 3 |
| 29 | 7 | 1 |
| 30 | 7 | 2 |
| 31 | 7 | 3 |

FIG. 9 shows a preferable scanning path for an 8 by 8 pixel block's frequency coefficient array, where N=8 and M=8. The numbers in FIG. 9 represent the frequency coefficient scanning order. For example, the frequency coefficient corresponding to the top left pixel is the first frequency coefficient to get scanned and is thus labeled with a 0. The frequency coefficient corresponding to the bottom right pixel is the last frequency coefficient to get scanned and is thus labeled with a 63. Table 5 lists the frequency coefficient scanning order and the corresponding values for n and m.

TABLE 5

Eight by eight pixel block scanning order

| Frequency Coefficient Scanning Order | n | m |
|---|---|---|
| 0 | 0 | 0 |
| 1 | 0 | 1 |
| 2 | 0 | 2 |
| 3 | 1 | 0 |
| 4 | 1 | 1 |
| 5 | 0 | 3 |
| 6 | 0 | 4 |
| 7 | 1 | 2 |
| 8 | 2 | 0 |
| 9 | 1 | 3 |
| 10 | 0 | 5 |
| 11 | 0 | 6 |
| 12 | 0 | 7 |
| 13 | 1 | 4 |
| 14 | 2 | 1 |
| 15 | 3 | 0 |
| 16 | 2 | 2 |
| 17 | 1 | 5 |
| 18 | 1 | 6 |
| 19 | 1 | 7 |
| 20 | 2 | 3 |
| 21 | 3 | 1 |
| 22 | 4 | 0 |
| 23 | 3 | 2 |
| 24 | 2 | 4 |
| 25 | 2 | 5 |
| 26 | 2 | 6 |
| 27 | 2 | 7 |
| 28 | 3 | 3 |
| 29 | 4 | 1 |
| 30 | 5 | 0 |
| 31 | 4 | 2 |
| 32 | 3 | 4 |
| 33 | 3 | 5 |
| 34 | 3 | 6 |
| 35 | 3 | 7 |
| 36 | 4 | 3 |
| 37 | 5 | 1 |
| 38 | 6 | 0 |
| 39 | 5 | 2 |
| 40 | 4 | 4 |
| 41 | 4 | 5 |
| 42 | 4 | 6 |
| 43 | 4 | 7 |
| 44 | 5 | 3 |
| 45 | 6 | 1 |
| 46 | 6 | 2 |
| 47 | 5 | 4 |
| 48 | 5 | 5 |
| 49 | 5 | 6 |
| 50 | 5 | 7 |
| 51 | 6 | 3 |
| 52 | 7 | 0 |
| 53 | 7 | 1 |
| 54 | 6 | 4 |
| 55 | 6 | 5 |
| 56 | 6 | 6 |
| 57 | 6 | 7 |
| 58 | 7 | 2 |
| 59 | 7 | 3 |
| 60 | 7 | 4 |
| 61 | 7 | 5 |
| 62 | 7 | 6 |
| 63 | 7 | 7 |

The preceding description has been presented only to illustrate and describe embodiments of invention. It is not intended to be exhaustive or to limit the invention to any precise form disclosed. Many modifications and variations are possible in light of the above teaching.

The foregoing embodiments were chosen and described in order to illustrate principles of the invention and some practical applications. The preceding description enables others skilled in the art to utilize the invention in various embodiments and with various modifications as are suited to the particular use contemplated. It is intended that the scope of the invention be defined by the following claims.

What is claimed is:

1. A method of transform-based encoding digital video content wherein the digital video content is represented in a two dimensional array of frequency coefficients, wherein the two dimensional array of frequency coefficients is represented in columns and rows, the columns represented by a variable n=0, 1, 2, or 3 and the rows represented by a variable m=0, 1, 2, or 3 the method comprising:
scanning the two dimensional array of frequency coefficients in a scanning order staffing at 0 and ending at 15 further comprising:
scanning the two dimensional array coefficient located at n=0 and m=0 at scanning order 0;
scanning the two dimensional array coefficient located at n=0 and m=1 at scanning order 1;
scanning the two dimensional array coefficient located at n=1 and m=0 at scanning order 2;
scanning the two dimensional array coefficient located at n=0 and m=2 at scanning order 3;
scanning the two dimensional array coefficient located at n=0 and m=3 at scanning order 4;

scanning the two dimensional array coefficient located at n=1 and m=1 at scanning order 5;

scanning the two dimensional array coefficient located at n=1 and m=2 at scanning order 6;

scanning the two dimensional array coefficient located at n=1 and m=3 at scanning order 7;

scanning the two dimensional array coefficient located at n=2 and m=0 at scanning order 8;

scanning the two dimensional array coefficient located at n=2 and m=1 at scanning order 9;

scanning the two dimensional array coefficient located at n=2 and m=3 at scanning order 10;

scanning the two dimensional array coefficient located at n=2 and m=3 at scanning order 11;

scanning the two dimensional array coefficient located at n=3 and m=0 at scanning order 12;

scanning the two dimensional array coefficient located at n=3 and m=1 at scanning order 13;

scanning the two dimensional array coefficient located at n=3 and m=2 at scanning order 14; and scanning the two dimensional array coefficient located at n=3 and m=3 at scanning order 15.

2. A method of transform-based encoding digital video content wherein the digital video content is represented in a two dimensional array of frequency coefficients, wherein the two dimensional array of frequency coefficients is represented in columns and rows, the columns represented by a variable $n=0, 1, 2,$ or $3$ and the rows represented by a variable $m=0, 1, 2,$ or $3$ the method comprising:

generating a one dimensional array of frequency coefficients from the two dimensional array of frequency coefficients wherein the one dimensional array of frequency coefficients is represented by a variable $p=0, 1, 2, 3, 4, 5, 6, 7, 8, 9, 10, 11, 12, 13, 14,$ or $15$, further comprising:

assigning the value of the two dimensional array coefficient located at n=0 and m=0 to a value of a one dimensional frequency coefficient at p=0;

assigning the value of the two dimensional array coefficient located at n=0 and m=1 to a value of a one dimensional frequency coefficient at p=1;

assigning the value of the two dimensional array coefficient located at n=1 and m=0 to a value of a one dimensional frequency coefficient at p=2;

assigning the value of the two dimensional array coefficient located at n=0 and m=2 to a value of a one dimensional frequency coefficient at p=3;

assigning the value of the two dimensional array coefficient located at n=0 and m=3 to a value of the one dimensional frequency coefficient at p=4;

assigning the value of the two dimensional array coefficient located at n=1 and m=1 to a value of the one dimensional frequency coefficient at p=5;

assigning the value of the two dimensional array coefficient located at n=1 and m=2 to a value of the one dimensional frequency coefficient at p=6;

assigning the value of the two dimensional array coefficient located at n=1 and m=3 to a value of the one dimensional frequency coefficient at p=7;

assigning the value of the two dimensional array coefficient located at n=2 and m=0 to a value of the one dimensional frequency coefficient at p=8;

assigning the value of the two dimensional array coefficient located at n=2 and m=1 to a value of the one dimensional frequency coefficient at p=9;

assigning the value of the two dimensional array coefficient located at n=2 and m=2 to a value of the one dimensional frequency coefficient at p=10;

assigning the value of the two dimensional array coefficient located at n=2 and m=3 to a value of the one dimensional frequency coefficient at p=11;

assigning the value of the two dimensional array coefficient located at n=3 and m=0 to a value of the one dimensional frequency coefficient at p=12;

assigning the value of the two dimensional array coefficient located at n=3 and m=1 to a value of the one dimensional frequency coefficient at p=13;

assigning the value of the two dimensional array coefficient located at n=3 and m=2 to a value of the one dimensional frequency coefficient at p=14; and assigning the value of the two dimensional array coefficient located at n=3 and m=3 to a value of the one dimensional frequency coefficient at p=15.

3. A device that encodes digital video content wherein the digital video content is represented in a two dimensional array of frequency coefficients wherein the two dimensional array of frequency coefficients is represented in columns and rows, the columns represented by a variable $n=0, 1, 2,$ or $3$, the rows represented by a variable $m=0, 1, 2,$ or $3$, the device comprising:

a scanner that scans the two dimensional array of frequency coefficients in a scanning order starting at 0 and ending at 15 further comprising:

scanning the two dimensional array coefficient located at n=0 and m=0 at scanning order 0;

scanning the two dimensional array coefficient located at n=0 and m=1 at scanning order 1;

scanning the two dimensional array coefficient located at n=1 and m=0 at scanning order 2;

scanning the two dimensional array coefficient located at n=0 and m=2 at scanning order 3;

scanning the two dimensional array coefficient located at n=0 and m=3 at scanning order 4;

scanning the two dimensional array coefficient located at n=1 and m=1 at scanning order 5;

scanning the two dimensional array coefficient located at n=1 and m=2 at scanning order 6;

scanning the two dimensional array coefficient located at n=1 and m=3 at scanning order 7;

scanning the two dimensional array coefficient located at n=2 and m=0 at scanning order 8;

scanning the two dimensional array coefficient located at n=2 and m=1 at scanning order 9;

scanning the two dimensional array coefficient located at n=2 and m=2 at scanning order 10;

scanning the two dimensional array coefficient located at n=2 and m=3 at scanning order 11;

scanning the two dimensional array coefficient located at n=3 and m=0 at scanning order 12;

scanning the two dimensional array coefficient located at n=3 and m=1 at scanning order 13;

scanning the two dimensional array coefficient located at n=3 and m=2 at scanning order 14; and scanning the two dimensional array coefficient located at n=3 and m=3 at scanning order 15.

4. A device for encoding digital video content wherein the digital video content is represented in a two dimensional array of frequency coefficients wherein the two dimensional array of frequency coefficients is represented in columns and rows, the columns represented by a variable $n=0, 1, 2,$ or $3$, the rows represented by a variable $m=0, 1, 2,$ or $3$ the method comprising:

a generator that generates a one dimensional array of frequency coefficients from the two dimensional array of frequency coefficients wherein the one dimensional array of frequency coefficients is represented by a variable p=0, 1, 2, 3, 4, 5, 6, 7, 8, 9, 10, 11, 12, 13, 14, or 15, further comprising:

assigning the value of the two dimensional array coefficient located at n=0 and m=0 to a value of a one dimensional frequency coefficient at p=0;

assigning the value of the two dimensional array coefficient located at n=0 and m=1 to a value of a one dimensional frequency coefficient at p=1;

assigning the value of the two dimensional array coefficient located at n=1 and m=0 to a value of a one dimensional frequency coefficient at p=2;

assigning the value of the two dimensional array coefficient located at n=0 and m=2 to a value of a one dimensional frequency coefficient at p=3;

assigning the value of the two dimensional array coefficient located at n=0 and m=3 to a value of the one dimensional frequency coefficient at p=4;

assigning the value of the two dimensional array coefficient located at n=1 and m=1 to a value of the one dimensional frequency coefficient at p=5;

assigning the value of the two dimensional array coefficient located at n=1 and m=2 to a value of the one dimensional frequency coefficient at p=6;

assigning the value of the two dimensional array coefficient located at n=1 and m=3 to a value of the one dimensional frequency coefficient at p=7;

assigning the value of the two dimensional array coefficient located at n=2 and m=0 to a value of the one dimensional frequency coefficient at p=8;

assigning the value of the two dimensional array coefficient located at n=2 and m=1 to a value of the one dimensional frequency coefficient at p=9;

assigning the value of the two dimensional array coefficient located at n=2 and m=2 to a value of the one dimensional frequency coefficient at p=10;

assigning the value of the two dimensional array coefficient located at n=2 and m=3 to a value of the one dimensional frequency coefficient at p=11;

assigning the value of the two dimensional array coefficient located at n=3 and m=0 to a value of the one dimensional frequency coefficient at p=12;

assigning the value of the two dimensional array coefficient located at n=3 and m=1 to a value of the one dimensional frequency coefficient at p=13;

assigning the value of the two dimensional array coefficient located at n=3 and m=2 to a value of the one dimensional frequency coefficient at p=14; and assigning the value of the two dimensional array coefficient located at n=3 and m=3 to a value of the one dimensional frequency coefficient at p=15.

5. A method of transform-based decoding digital video content wherein the digital video content is represented in a one dimensional array of frequency coefficients, the method comprising:

scanning the one dimensional array of frequency coefficients in a scanning order p starting at 0 and ending at 15, consecutively, to produce a representation of the digital video content in a two dimensional array of frequency coefficients, the two dimensional array of frequency coefficients is represented in columns and rows wherein the columns are represented by a variable n=0, 1, 2, or 3, and the rows are represented by a variable m=0, 1, 2, or 3, further comprising;

assigning the two dimensional frequency coefficient located at n=0 and m=0 a value of the one dimensional frequency coefficient located at p=0;

assigning the two dimensional frequency coefficient located at n=0 and m=1 a value of the one dimensional frequency coefficient located at p=1;

assigning the two dimensional frequency coefficient located at n=1 and m=0 a value of the one dimensional frequency coefficient located at p=2;

assigning the two dimensional frequency coefficient located at n=0 and m=2 a value of the one dimensional frequency coefficient located at p=3;

assigning the two dimensional frequency coefficient located at n=0 and m=3 a value of the one dimensional frequency coefficient located at p=4;

assigning the two dimensional frequency coefficient located at n=1 and m=1 a value of the one dimensional frequency coefficient located at p=5;

assigning the two dimensional frequency coefficient located at n=1 and m=2 a value of the one dimensional frequency coefficient located at p=6;

assigning the two dimensional frequency coefficient located at n=1 and m=3 a value of the one dimensional frequency coefficient located at p=7;

assigning the two dimensional frequency coefficient located at n=2 and m=0 a value of the one dimensional frequency coefficient located at p=8;

assigning the two dimensional frequency coefficient located at n=2 and m=1 a value of the one dimensional frequency coefficient located at p=9;

assigning the two dimensional frequency coefficient located at n=2 and m=2 a value of the one dimensional frequency coefficient located at p=10;

assigning the two dimensional frequency coefficient located at n=2 and m=3 a value of the one dimensional frequency coefficient located at p=11;

assigning the two dimensional frequency coefficient located at n=3 and m=0 a value of the one dimensional frequency coefficient located at p=12;

assigning the two dimensional frequency coefficient located at n=3 and m=1 a value of the one dimensional frequency coefficient located at p=13;

assigning the two dimensional frequency coefficient located at n=3 and m=2 a value of the one dimensional frequency coefficient located at p=14; and assigning the two dimensional frequency coefficient located at n=3 and m=3 a value of the one dimensional frequency coefficient located at p=15.

6. A method of transform-based decoding digital video content wherein the digital video content is represented in a one dimensional array of frequency coefficients wherein the one dimensional array of frequency coefficients is represented by a variable p=0, 1, 2, 3, 4, 5, 6, 7, 8, 9, 10, 11, 12, 13, 14, or 15, the method comprising:

generating a two dimensional array of frequency coefficients from the one dimensional array of frequency coefficients, wherein the two dimensional array of frequency coefficients is represented in columns and rows wherein the columns are represented by a variable n=0, 1, 2, or 3, and the rows are represented by a variable m=0, 1, 2, or 3, further comprising;

assigning the two dimensional frequency coefficient located at n=0 and m=0 a value of the one dimensional frequency coefficient located at p=0;

assigning the two dimensional frequency coefficient located at n=0 and m=1 a value of the one dimensional frequency coefficient located at p=1;

assigning the two dimensional frequency coefficient located at n=1 and m=0 a value of the one dimensional frequency coefficient located at p=2;

assigning the two dimensional frequency coefficient located at n=0 and m=2 a value of the one dimensional frequency coefficient located at p=3;

assigning the two dimensional frequency coefficient located at n=0 and m=3 a value of the one dimensional frequency coefficient located at p=4;

assigning the two dimensional frequency coefficient located at n=1 and m=1 a value of the one dimensional frequency coefficient located at p=5;

assigning the two dimensional frequency coefficient located at n=1 and m=2 a value of the one dimensional frequency coefficient located at p=6;

assigning the two dimensional frequency coefficient located at n=1 and m=3 a value of the one dimensional frequency coefficient located at p=7;

assigning the two dimensional frequency coefficient located at n=2 and m=0 a value of the one dimensional frequency coefficient located at p=8;

assigning the two dimensional frequency coefficient located at n=2 and m=1 a value of the one dimensional frequency coefficient located at p=9;

assigning the two dimensional frequency coefficient located at n=2 and m=2 a value of the one dimensional frequency coefficient located at p=10;

assigning the two dimensional frequency coefficient located at n=2 and m=3 a value of the one dimensional frequency coefficient located at p=11;

assigning the two dimensional frequency coefficient located at n=3 and m=0 a value of the one dimensional frequency coefficient located at p=12;

assigning the two dimensional frequency coefficient located at n=3 and m=1 a value of the one dimensional frequency coefficient located at p=13;

assigning the two dimensional frequency coefficient located at n=3 and m=2 a value of the one dimensional frequency coefficient located at p=14; and assigning the two dimensional frequency coefficient located at n=3 and m=3 a value of the one dimensional frequency coefficient located at p=15.

7. A device for decoding digital video content wherein the digital video content is represented in a one dimensional array of frequency coefficients, the device comprising:

a scanner that scans the one dimensional array of frequency coefficients in a scanning order p starting at 0 and ending at 15, consecutively, to produce a representation of the digital video content in a two dimensional array of frequency coefficients, the two dimensional array of frequency coefficients is represented in columns and rows wherein the columns are represented by a variable n=0, 1, 2, or 3, and the rows are represented by a variable m=0, 1, 2, or 3, further comprising;

assigning the two dimensional frequency coefficient located at n=0 and m=0 a value of the one dimensional frequency coefficient located at p=0;

assigning the two dimensional frequency coefficient located at n=0 and m=1 a value of the one dimensional frequency coefficient located at p=1;

assigning the two dimensional frequency coefficient located at n=1 and m=0 a value of the one dimensional frequency coefficient located at p=2;

assigning the two dimensional frequency coefficient located at n=0 and m=2 a value of the one dimensional frequency coefficient located at p=3;

assigning the two dimensional frequency coefficient located at n=0 and m=3 a value of the one dimensional frequency coefficient located at p=4;

assigning the two dimensional frequency coefficient located at n=1 and m=1 a value of the one dimensional frequency coefficient located at p=5;

assigning the two dimensional frequency coefficient located at n=1 and m=2 a value of the one dimensional frequency coefficient located at p=6;

assigning the two dimensional frequency coefficient located at n=1 and m=3 a value of the one dimensional frequency coefficient located at p=7;

assigning the two dimensional frequency coefficient located at n=2 and m=0 a value of the one dimensional frequency coefficient located at p=8;

assigning the two dimensional frequency coefficient located at n=2 and m=1 a value of the one dimensional frequency coefficient located at p=9;

assigning the two dimensional frequency coefficient located at n=2 and m=2 a value of the one dimensional frequency coefficient located at p=10;

assigning the two dimensional frequency coefficient located at n=2 and m=3 a value of the one dimensional frequency coefficient located at p=11;

assigning the two dimensional frequency coefficient located at n=3 and m=0 a value of the one dimensional frequency coefficient located at p=12;

assigning the two dimensional frequency coefficient located at n=3 and m=1 a value of the one dimensional frequency coefficient located at p=13;

assigning the two dimensional frequency coefficient located at n=3 and m=2 a value of the one dimensional frequency coefficient located at p=14; and assigning the two dimensional frequency coefficient located at n=3 and m=3 a value of the one dimensional frequency coefficient located at p=15.

8. A device for decoding digital video content wherein the digital video content is represented in a one dimensional array of frequency coefficients, wherein the one dimensional array of frequency coefficients is represented by a variable p=0, 1, 2, 3, 4, 5, 6, 7, 8, 9, 10, 11, 12, 13, 14, or 15, the device comprising:

a generator that produces a representation of the digital video content in a two dimensional array of frequency coefficients, the two dimensional array of frequency coefficients is represented in columns and rows wherein the columns are represented by a variable n=0, 1, 2, or 3, and the rows are represented by a variable m=0, 1, 2, or 3, further comprising;

assigning the two dimensional frequency coefficient located at n=0 and m=0 a value of the one dimensional frequency coefficient located at p=0;

assigning the two dimensional frequency coefficient located at n=0 and m=1 a value of the one dimensional frequency coefficient located at p=1;

assigning the two dimensional frequency coefficient located at n=1 and m=0 a value of the one dimensional frequency coefficient located at p=2;

assigning the two dimensional frequency coefficient located at n=0 and m=2 a value of the one dimensional frequency coefficient located at p=3;

assigning the two dimensional frequency coefficient located at n=0 and m=3 a value of the one dimensional frequency coefficient located at p=4;

assigning the two dimensional frequency coefficient located at n=1 and m=1 a value of the one dimensional frequency coefficient located at p=5;

assigning the two dimensional frequency coefficient located at n=1 and m=2 a value of the one dimensional frequency coefficient located at p=6;

assigning the two dimensional frequency coefficient located at n=1 and m=3 a value of the one dimensional frequency coefficient located at p=7;

assigning the two dimensional frequency coefficient located at n=2 and m=0 a value of the one dimensional frequency coefficient located at p=8;

assigning the two dimensional frequency coefficient located at n=2 and m=1 a value of the one dimensional frequency coefficient located at p=9;

assigning the two dimensional frequency coefficient located at n=2 and m=2 a value of the one dimensional frequency coefficient located at p=10;

assigning the two dimensional frequency coefficient located at n=2 and m=3 a value of the one dimensional frequency coefficient located at p=11;

assigning the two dimensional frequency coefficient located at n=3 and m=0 a value of the one dimensional frequency coefficient located at p=12;

assigning the two dimensional frequency coefficient located at n=3 and m=1 a value of the one dimensional frequency coefficient located at p=13;

assigning the two dimensional frequency coefficient located at n=3 and m=2 a value of the one dimensional frequency coefficient located at p=14; and assigning the two dimensional frequency coefficient located at n=3 and m=3 a value of the one dimensional frequency coefficient located at p=15.

9. A computer readable medium encoded with a computer program used to control a video processor that receives a first signal wherein the first signal is represented in a two dimensional array of frequency coefficients wherein the two dimensional array of frequency coefficients is represented in columns and rows, the columns represented by a variable n=0, 1, 2, or 3, the rows represented by a variable m=0, 1, 2, or 3, the computer readable medium controlling the video processor in a method comprising:

generating a one dimensional array of frequency coefficients from the two dimensional array of frequency coefficients wherein the one dimensional array of frequency coefficients is represented by a variable p=0, 1, 2, 3, 4, 5, 6, 7, 8, 9, 10, 11, 12, 13, 14, or 15, further comprising:

assigning the value of the two dimensional array coefficient located at n=0 and m=0 to a value of a one dimensional frequency coefficient at p=0;

assigning the value of the two dimensional array coefficient located at n=0 and m=1 to a value of a one dimensional frequency coefficient at p=1;

assigning the value of the two dimensional array coefficient located at n=1 and m=0 to a value of a one dimensional frequency coefficient at p=2;

assigning the value of the two dimensional array coefficient located at n=0 and m=2 to a value of a one dimensional frequency coefficient at p=3;

assigning the value of the two dimensional array coefficient located at n=0 and m=3 to a value of the one dimensional frequency coefficient at p=4;

assigning the value of the two dimensional array coefficient located at n=1 and m=1 to a value of the one dimensional frequency coefficient at p=5;

assigning the value of the two dimensional array coefficient located at n=1 and m=2 to a value of the one dimensional frequency coefficient at p=6;

assigning the value of the two dimensional array coefficient located at n=1 and m=3 to a value of the one dimensional frequency coefficient at p=7;

assigning the value of the two dimensional array coefficient located at n=2 and m=0 to a value of the one dimensional frequency coefficient at p=8;

assigning the value of the two dimensional array coefficient located at n=2 and m=1 to a value of the one dimensional frequency coefficient at p=9;

assigning the value of the two dimensional array coefficient located at n=2 and m=2 to a value of the one dimensional frequency coefficient at p=10;

assigning the value of the two dimensional array coefficient located at n=2 and m=3 to a value of the one dimensional frequency coefficient at p=11;

assigning the value of the two dimensional array coefficient located at n=3 and m=0 to a value of the one dimensional frequency coefficient at p=12;

assigning the value of the two dimensional array coefficient located at n=3 and m=1 to a value of the one dimensional frequency coefficient at p=13;

assigning the value of the two dimensional array coefficient located at n=3 and m=2 to a value of the one dimensional frequency coefficient at p=14; and assigning the value of the two dimensional array coefficient located at n=3 and m=3 to a value of the one dimensional frequency coefficient at p=15.

10. A computer readable medium encoded with a computer program used to control a video processor that receives a first signal wherein the first signal is represented in a one dimensional array of frequency coefficients wherein the one dimensional array of frequency coefficients is represented by a variable p=0, 1, 2, 3, 4, 5, 6, 7, 8, 9, 10, 11, 12, 13, 14, or 15, the computer readable medium controlling the video processor in a method comprising:

generating a two dimensional array of frequency coefficients from the one dimensional array of frequency coefficients, wherein the two dimensional array of frequency coefficients is represented in columns and rows wherein the columns are represented by a variable n=0, 1, 2, or 3, and the rows are represented by a variable m=0, 1, 2, or 3, further comprising;

assigning the two dimensional frequency coefficient located at n=0 and m=0 a value of the one dimensional frequency coefficient located at p=0;

assigning the two dimensional frequency coefficient located at n=0 and m=1 a value of the one dimensional frequency coefficient located at p=1;

assigning the two dimensional frequency coefficient located at n=1 and m=0 a value of the one dimensional frequency coefficient located at p=2;

assigning the two dimensional frequency coefficient located at n=0 and m=2 a value of the one dimensional frequency coefficient located at p=3;

assigning the two dimensional frequency coefficient located at n=0 and m=3 a value of the one dimensional frequency coefficient located at p=4;

assigning the two dimensional frequency coefficient located at n=1 and m=1 a value of the one dimensional frequency coefficient located at p=5;

assigning the two dimensional frequency coefficient located at n=1 and m=2 a value of the one dimensional frequency coefficient located at p=6;

assigning the two dimensional frequency coefficient located at n=1 and m=3 a value of the one dimensional frequency coefficient located at p=7;

assigning the two dimensional frequency coefficient located at n=2 and m=0 a value of the one dimensional frequency coefficient located at p=8;

assigning the two dimensional frequency coefficient located at n=2 and m=1 a value of the one dimensional frequency coefficient located at p=9;

assigning the two dimensional frequency coefficient located at n=2 and m=2 a value of the one dimensional frequency coefficient located at p=10;

assigning the two dimensional frequency coefficient located at n=2 and m=3 a value of the one dimensional frequency coefficient located at p=11;

assigning the two dimensional frequency coefficient located at n=3 and m=0 a value of the one dimensional frequency coefficient located at p=12;

assigning the two dimensional frequency coefficient located at n=3 and m=1 a value of the one dimensional frequency coefficient located at p=13;

assigning the two dimensional frequency coefficient located at n=3 and m=2 a value of the one dimensional frequency coefficient located at p=14; and assigning the two dimensional frequency coefficient located at n=3 and m=3 a value of the one dimensional frequency coefficient located at p=15.

* * * * *